No. 685,043. Patented Oct. 22, 1901.
W. T. GIBBS.
ELECTRIC METHOD OF FUSION.
(Application filed Mar. 15, 1901.)
(No Model.)
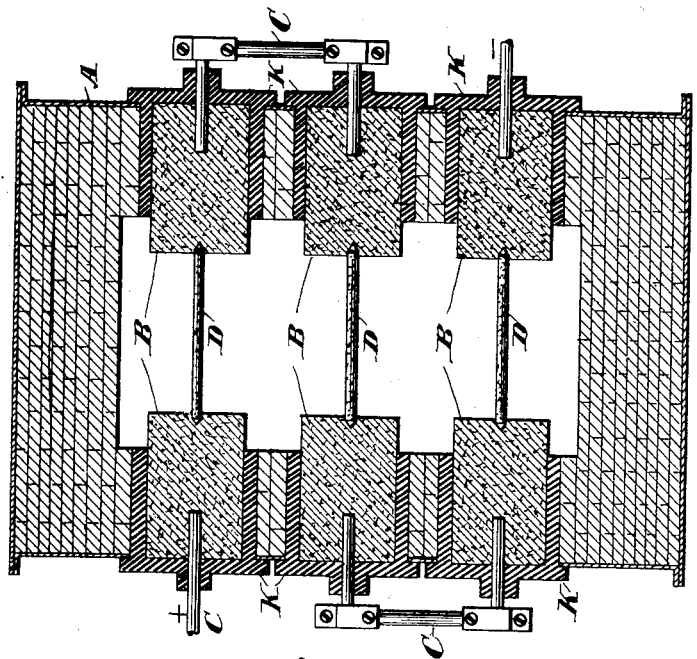
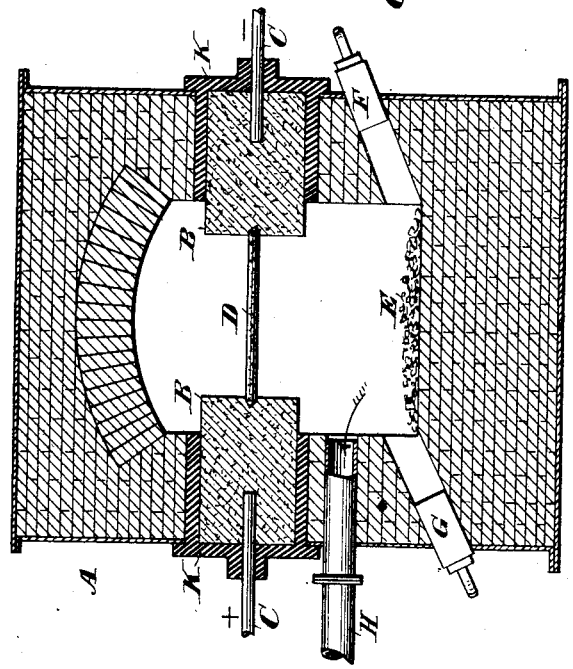
Attest:
Geo H Botts
T F Kehoe
Inventor:
William T Gibbs
By Phil T Sawyer Rice
Kennedy Attys
THE NORRIS PETERS CO., PHOTO-LITHO., WASHINGTON, D. C.

UNITED STATES PATENT OFFICE.

WILLIAM T. GIBBS, OF BUCKINGHAM, CANADA.

ELECTRIC METHOD OF FUSION.

SPECIFICATION forming part of Letters Patent No. 685,043, dated October 22, 1901.

Original application filed October 14, 1897, Serial No. 655,111. Divided and this application filed March 15, 1901. Serial No. 51,304. (No specimens.)

*To all whom it may concern:*

Be it known that I, WILLIAM T. GIBBS, a subject of the King of Great Britain, residing at Buckingham, Province of Quebec, county of Ottawa, Canada, have invented certain new and useful Improvements in Electric Methods of Fusion, fully described and represented in the following specification and the accompanying drawings, forming a part of the same, said improvements being embraced in Letters Patent of foreign countries, as follows: Germany, No. 107,736, dated February 4, 1898, and Great Britain, No. 4,819, dated February 26, 1898.

My invention relates to methods of fusion for the reduction of minerals and analogous purposes, the general object of the invention being to avoid the difficulties existing with present electric methods of fusion and to provide a method of more general application than those now in use.

In electric methods of fusion it has heretofore been thought necessary to either use an arc or to pass the current through the material itself or through a high-resistance medium placed in immediate contact with the material.

Apart from the economical objections to the use of the arc and the constant manual regulation of the carbons required methods of electric fusion employing the arc are inapplicable or very objectionable in many cases on account of the continuous destruction of the carbons, which distributes carbon-dust throughout the product of the furnace, so as to make a pure product impossible, and because the arc is accompanied by extremely high local temperatures, much higher than is required for any smelting operation and productive of injurious results. In many cases also the vapor of carbon which is given off injures the product in the same way as the carbon-dust. In smelting some metals also—as, for instance, zinc—it is impossible to obtain an arc owing to the conductive properties of the vapor of the metal, so that no method of electric fusion employing an arc can be used. When the current is passed through a high-resistance medium placed in immediate contact with the material, that medium is sometimes in a granular form and sometimes in the shape of a comparatively small rod. In methods of fusion in which a granular high-resistance mass is placed in contact with the material to be reduced the contact of the material with the incandescent carbon causes more or less oxidation of the carbon and consequent diffusion of the carbon through the material reduced, interfering in this manner, as in the case of the arc, with the purity of the product. Again, the current in passing from one portion to another of a granular mass makes a large number of small arcs which have the same effect in the formation of carbon dust and vapor and of an injuriously high local temperature as a single large arc. The constant attention of an operator is required also to secure practical results, because owing to the change in position of the granular particles the resistance of the mass of carbon is continually varying, requiring constant attention to the regulation of the current, satisfactory results in such processes, therefore, depending upon skill and constant attention. Such methods also are not applicable in many cases in which it is not practical to bring the incandescent material into contact with the articles to be heated.

When the high-resistance medium through which the current is passed is in the shape of a comparatively small carbon rod placed in immediate contact with the material to be treated, the carbon rod merely furnishes a path for the current at the beginning of the smelting operation and is then destroyed and replaced by an arc, or else the current then passes through the molten material itself. This method involves most of the disadvantages incident to both the processes above referred to. When the current passes through the material itself also, the resistance will be continually varying with the ebullition of the molten mass, the circuit at times being intercepted by large quantities of gas and at times traversing a nearly continuous path through molten material, so that the process is subject to great irregularity. Moreover, a process in which the current is passed through the material itself is of course not generally applicable, since most metals have too high a degree of conductivity, and its use is limited to those materials which have a relatively high resistance.

My invention consists of a process in which the heat is developed by the passage of the current through a continuous high-resistance medium, as a carbon rod, in a closed furnace and out of contact with the material to be treated. The heat is transmitted from the conductor to the material under treatment directly by radiation and reflection without the interposition of any substance between the material treated and the conductor.

In the drawings annexed, forming a part of this specification, Figure 1 is a vertical section of the furnace adapted for use in carrying out my process, and Fig. 2 is a plan view of a modification which may be used for larger furnaces.

Referring to said drawings, the furnace A is a chamber built of any suitable refractory material, as fire-brick or carbon, having, preferably, an arched roof, although this is not essential to the furnace. The current is preferably introduced to the furnace through the conductors C C, which connect with carbon blocks or abutments B, between which extends the resistance-rod D. The material E to be treated rests upon the bottom of the chamber and may be introduced through the inlet-pipe F and the fused material may be drawn off through the exit G. H is an outlet-pipe for the escape of gas and, in case of a volatile product, for drawing off the product. The blocks B may be fixed in the furnace in any suitable manner. I find a good construction to be the insertion of the blocks in the iron sockets K.

It is an advantage of my process that a furnace can be built to utilize almost any desired amount of power in carrying it out. This may be done by providing the furnace with a number of resistance-conductors and passing the current in series through them, as shown in diagram in Fig. 2, in which a furnace is illustrated containing three sets of abutments, the current passing in succession through each. This is impracticable where arcs are employed, since it is not feasible to operate arcs in series in the case of a furnace.

By the use of my process the difficulties existing with prior electric methods of fusion are avoided. The material to be fused can be wholly preserved from contact with carbon and carbon-vapor, and it has very numerous advantages over the processes in common use which have been described above. The carbon resistance being out of contact with the material to be reduced at all times, both when said material is in solid and fused condition, and not being subject to material disintegration by the action of the current, as in the case of the arc, the material to be reduced is not subjected either to carbon-dust or carbon-vapor, and the process is con-continuous instead of being intermittent, as it is where an arc is the source of heat. There are no local extremely high temperatures, as in the case of the arc, but a substantially uniform and adjusted temperature is secured, which is subject to absolute regulation from the lowest to the highest temperatures, and the process is not dependent upon the constant attention of an operator, as the flow of the current is constant and uniform, except as variations are introduced by changing the adjustment. It will be observed also that my process may be used where a process involving the use of an arc would be wholly impracticable on account of the impossibility of obtaining an arc, as in the case of zinc. The action of the heat is upon all the material being treated instead upon only a portion of the material, as is the case where the incandescent conductor is placed in the material to be reduced, and my process need not be interrupted for the introduction of new material or the removal of the reduced product or of slag until such time as is desired.

There have been suggested heaters or ovens in which the conductors are placed in the sides or walls of the chamber which holds the material to be reduced. These conductors have usually been of metal. Ovens or heaters of this construction are not adapted, and, so far as I am aware, their use has not been attempted for metallurgical operations, since the degree of heat which they are capable of developing is not suitable therefor. I am aware that suggestions have been made that heaters of such construction could be used as furnaces, but I know that this could not be done in metallurgical operations. Moreover, even if a sufficiently high degree of heat could be developed therein for metallurgical purposes the material treated when fused would come into contact with the conductor, producing oxidation, contaminating the material under treatment, and in some instances short-circuiting the current, thereby rendering the process impracticable. In some cases it has been proposed to inclose the material being treated in such a heater in a crucible placed between the material under treatment and the conductor. The interposition of the crucible would of course very greatly reduce the amount of heat available, and for this reason also, as well as on account of the contamination of the material under treatment by contact with the carbon of the crucible, a process employing such a construction of heater could not be employed for metallurgical operations.

By "continuous conductor" herein I mean such a conductor that the current flows through the same without any interruption such as would be produced by the separation of two portions of the conductor after the manner of the carbon rods in an electric-arc lamp.

This application forms a division of my application Serial No. 655,111, filed October 14, 1897.

What I claim is—

The method of fusion which consists in placing the material to be treated in a closed furnace, passing an electric current through a continuous conducting medium of high resistance in said chamber out of contact with the walls of the chamber and said material both when the same is in a solid and fused condition, and causing the heat to act thereon directly by radiation and reflection without the interposition of any substance between the material treated and the conductor, substantially as described.

In testimony whereof I have hereunto set my hand in the presence of two subscribing witnesses.

WILLIAM T. GIBBS.

Witnesses:
C. J. SAWYER,
A. A. V. BOURKE.